Aug. 4, 1970  J. L. SWICKARD, JR  3,522,630
GUIDE APPARATUS FOR THERMOPLASTIC TUBES
Filed Aug. 2, 1968
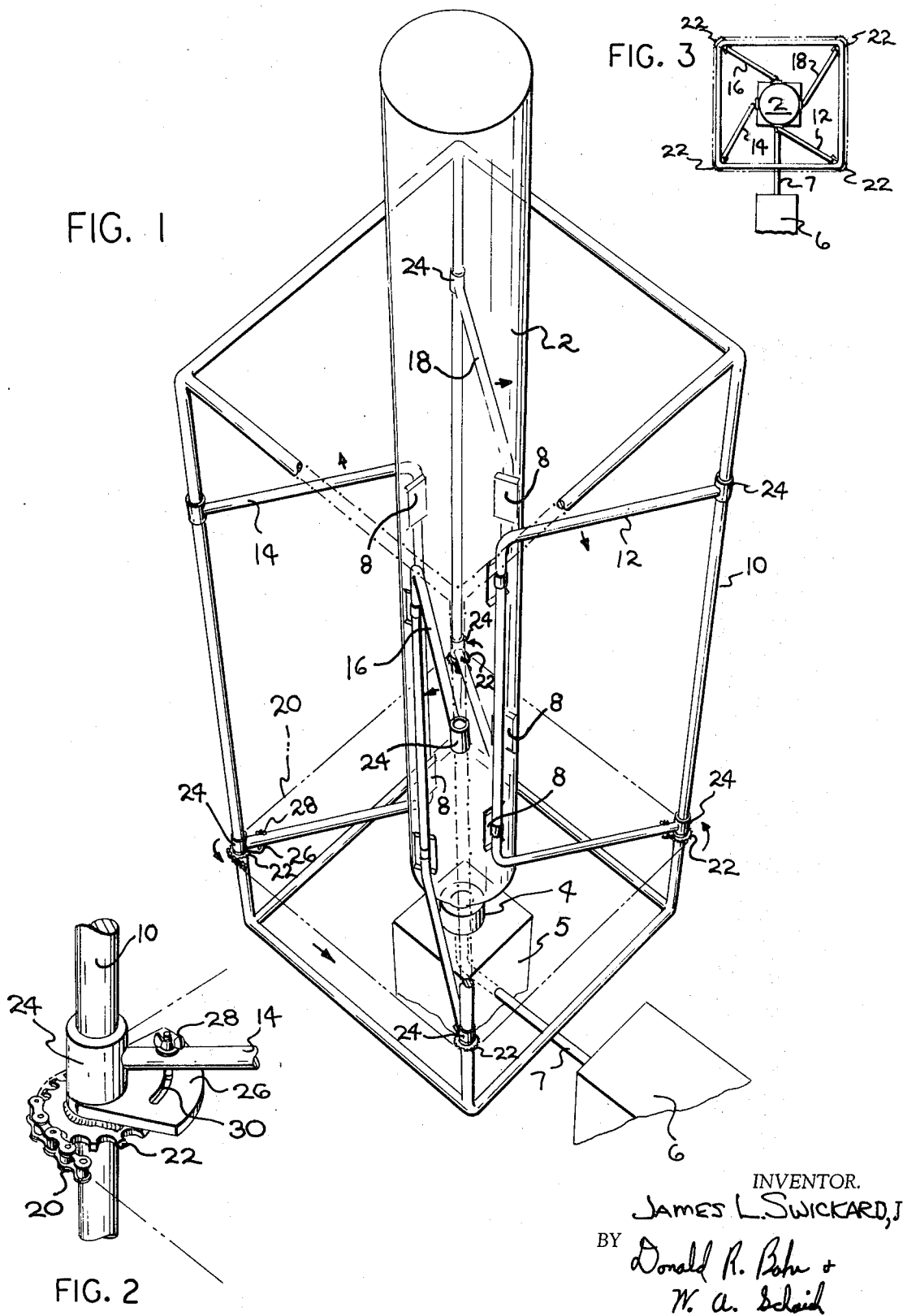
INVENTOR.
JAMES L. SWICKARD, JR
BY Donald R. Bohr &
W. A. Schaich
ATTORNEYS United States Patent Office 3,522,630
Patented Aug. 4, 1970

3,522,630
GUIDE APPARATUS FOR THERMOPLASTIC TUBES
James L. Swickard, Jr., Toledo, Ohio, assignor to Owens-Illinois, Inc., a corporation of Ohio
Filed Aug. 2, 1968, Ser. No. 749,742
Int. Cl. B29d 23/00
U.S. Cl. 18—14                                          7 Claims

ABSTRACT OF THE DISCLOSURE

This disclosure relates to a guiding mechanism for a continuously drawn and blown thermoplastic tube. The guide mechanism comprises a plurality of juxtaposed U-shaped members, the bottom of the U-shaped member being positioned parallel to the axis of the blown thermoplastic tube. The U-shaped members are pivotally mounted in spaced relation in such a fashion that they can move in a plane which is at right angles to the axis of the blown thermoplastic tube. All guide members are inter-connected in such a fashion that the movement of one moves the others an equal distance to maintain the guide elements in coaxial alignment with the drawn tube.

BACKGROUND OF THE INVENTION

This invention is concerned with a guiding means for a continuously drawn and blown thermoplastic tube. Thermoplastic films are often formed by means of blowing an extruded thermoplastic tube. During cooling, this thermoplastic tube is often drawn upwardly. During its drawing sequence, it is often desirous to have guide elements contact the tube whereby the lateral movement of the plastic tube can be somewhat regulated. The guide mechanism of this invention generally comprises a plurality of spaced-apart U-shaped members, the bottom of the U-shaped member being positioned parallel to the axis of the blown thermoplastic tube.

As was mentioned above, thermoplastic films are often formed by means of blowing a thermoplastic tube. After formation, the thermoplastic tube is drawn upwardly and is essentially unsupported in many cases for a vertical distance of from about fifteen to forty feet. During this period of travel, certain instabilities can occur in the tube in such a fashion that the quality of the resulting film is adversely affected. In many cases, for example, air currents in the form of slight drafts can create a pressure differential on one side of the tube in such a fashion that the tube is deflected sideways during its continuous upward travel and both the roll formation and the uniformity of the caliper of the resulting film are adversely affected. Likewise, minute temperature variations in the tube as it leaves the extruder die can cause the tube to be unevenly blown on one side and hence become uneven throughout its length. Likewise, slight variations in the homogeneity of the resin utilized can cause the tube to vary slightly during the period in which it is being drawn upwardly. In these and other cases, the occurrence of an instability causes other instabilities of a repeating and cyclic nature; said continuance or an unstable condition generally being uncorrectable and uncontrollable without the tube being guided.

Another important variable which can effect tube instability is the ratio of the tube diameter to die diameter. In usual blowing procedures, the ratio of tube diameter to die diameter can be from about 1½:1 to 2½:1. However, when it is desirous to produce films having shrink capabilities, this ratio using low density polyethylene often approaches 4 to 1. When this ratio approaches the 4 to 1 range, additional tube instability often results.

The guide mechanism of this invention is particularly advantageous during the start-up sequence. Because the guide mechanism of this invention is readily adjustable, it can be adjusted in such a fashion to render support while the tube is being initially inflated and before it has reached its operating diameter.

By means of the subject invention, the above-described reasons for tube instability can be counteracted via positive guide elements which contact the deformable portion of the tube while it is being drawn upwardly.

The primary object of this invention is to provide a positive guide mechanism whereby thermoplastic tube instability or movement in a forming process can be overcome.

Another object of this invention comprises a plurality of U-shaped shoe or guide members which can be used to positively guide a thermoplastic tube during its forming sequence and while in deformable condition.

Still another object of this invention is to provide a guide apparatus for a thermoplastic tube which is readily adjustable.

Still another object of this invention is to provide a guide mechanism for a thermoplastic tube where the guiding elements comprise a plurality of U-shaped contact members and wherein the movement of all the guide members is synchronized.

Finally, the objects of this invention include all the other novel features which will be obvious from the specification and claims at hand.

The subject invention is generally illustrated in FIGS. 1, 2 and 3.

FIG. 1 is a perspective view of the overall guide apparatus showing the relationship of the individual guide members to the blown thermoplastic tube.

FIG. 2 is a fragmentary enlarged perspective view of the sprocket and chain whereby the movement of all individual guide members of this invention is synchronized.

FIG. 3 is a top plan view of the apparatus of this invention showing the relationship of the U-shaped guide members to the blown thermoplastic tube.

Specifically, referring to FIG. 1, a blown thermoplastic tube 2 is centrally formed and located between guide members 12, 14, 16 and 18. Blown thermoplastic tube 2 is formed by the extrusion of a thermoplastic material from an extruder 6 through a transfer pipe 7 into an extruder die 4 which is supported by an appropriate base member 5. Extruder die 4 has an annular orifice. By the extrusion of a softened thermoplastic material from the annular orifice, a circular thermoplastic tube 2 is formed which is continuously pulled upwardly. When thermoplastic tube 2 leaves the extruder die, it is in a softened thermoplastic state. While the thermoplastic tube is in a softened thermoplastic state, pneumatic pressure is applied to the inner periphery thereof in such a fashion as to cause the narrow diameter tube to expand during its upward drawing. Shortly after forming, the thermoplastic material solidifies. However, before the resulting tube can be stored on a roll or otherwise removed from the forming area, it must be further cooled to below its deformation temperature. This cooling is effected while the thermoplastic tube traverses a vertical distance which in many cases is on the order of about fifteen to forty feet. The apparatus whereby the thermoplastic tube is formed, notably the extruder, the die assembly and a source for applying pneumatic pressure to the inner periphery of the formed tube is well known in the art and not a part of this invention and hence is not described in detail. Examples of suitable apparatus which can be used in this aspect of the subject invention are described in detail in U.S. Pat. Nos. 3,221,084, 3,142,865 and 2,720,680.

As was described above, upon formation of the thermoplastic tube 2, pneumatic pressure is immediately applied to the inner periphery thereof in such a fashion that expanded tube 2 is immediately formed. This tube is guided in accordance with the subject invention by means of a plurality of spaced-apart U-shaped guide members 12, 14, 16 and 18. These U-shaped guide members have their bottom extremity positioned in an axis which is parallel to the axis of tube 2. The upper extremity of the U-shaped guide members 12, 14, 16 and 18 is attached to frame member 10 by bushings 24 which are positioned around frame member 10. Two bushings 24 are provided to receive the two extremities of each guide member. Said bushings are securely attached to the upper extremity as of said guide member by, for example, welding.

In operation, guide members 12, 14, 16 and 18 are positioned around the circumference of tube 2 at such a distance from the center of tube 2 that the desired degree of pressure or guiding is applied to tube 2.

FIG. 1 illustrates the use of two shoes 8 on each of guide members 12, 14, 16 and 18. Shoes 8, spaced apart in vertical alignment, generally facilitate the contacting of guide members 12, 14, 16 and 18 with tube 2. However, they are not a necessary part of this invention. Shoes 8 can facilitate guiding when the walls of tube 2 are extremely thin, for example, on the order of 1 mil or less. However, they are not necessary when the thickness of tube 2 is thicker, for example, on the order of 4 to 8 mils. Shoes 8 should have rounded corners in order to prevent the snagging or tearing of tube 2. For maximum efficiency, shoes 8 preferably have a Teflon coating. When shoes are not used, the contact areas of guide members 12, 14, 16 and 18 likewise can have a Teflon coating.

Referring to FIG. 2, it can be seen that bushing 24, to which guide member 14 is attached, is biased against locking plate 26 which contains an arcuate slot 30. Locking plate 26 is in turn rigidly attached by, for example, welding to a sprocket 22. Bushing 24 is not attached to locking plate 26 but is only biased against locking plate 26 by means of gravitational force. Guide members 12, 14, 16 and 18 each use a singular sprocket 22. The movement of all four guide members is synchronized by means of a chain 20 which engages sprockets 22. By means of the sprockets 22 and chain 20, the movement of one guide member immediately causes similar movement in the other guide members. By means of a locking plate 26, small adjustments in the relative position of guide members 12, 14, 16 and 18 to tube 2 can be effected. That is, all guide members can be carefully positioned so that their contact with tube 2 is optimum. When optimum contact is obtained, the guide members can be secured in stationary position relative to locking plate 26 by means of a locking bolt and nut assembly 28 which is positioned in arcuate slot 30. Many mechanical substitutions can be made for the above-described sprocket and chain assembly. For example, racks and pinions could be used in lieu of the described sprocket and chain assembly.

FIG. 3 is a plan view showing the relationship of all guide members to tube 2.

It is understood by one skilled in the art that variations in the subject invention can be effected. For example, while the disclosure of this invention is directed to a composite apparatus which utilizes four U-shaped guide members, a greater or lesser number of these guide members can be utilized. Likewise, the disclosure of this invention specifically illustrates the use of two shoes in conjunction with each guide member. However, it should be noted that greater or lesser numbers of these shoes can be utilized and they can be removed entirely from the U-shaped guide member whereupon the bottom or vertical portion of the U-shaped guide member would be in direct contact with tube 2. Likewise, sprockets and chain assemblies can be attached to both ends of the U-shaped guide members. Finally, while the invention illustrates a system whereby the guide members are manually positioned, it can be readily understood that an automatic drive system can be attached to sprocket 22.

What is claimed is:

1. An apparatus for guiding a blown thermoplastic tube which comprises a plurality of U-shaped guide members having the bottom of the U positioned in an axis which is parallel to the axis of the blown thermoplastic tube which, wherein the bottom portion of said U-shaped members is adapted to contact the blown thermoplastic tube, and wherein said U-shaped members are pivotally mounted in such a fashion that they can move in a plane which is at right angles to the axis of the blown thermoplastic tube.

2. The apparatus of claim 1 wherein all pivotally mounted guide members are inter-connected in such a fashion that the movement of one is synchronized with the movement of the other guide members.

3. The apparatus of claim 1 wherein all guide members are pivotally connected to a frame member which essentially surrounds the blown thermoplastic tube.

4. The apparatus of claim 1 wherein the guide means are used in conjunction with an extruder, an extruder die and a thermoplastic tube-blowing means.

5. The apparatus of claim 3 wherein all guide members are in a spaced-apart relationship and are inter-connected by means of a chain and sprocket assembly in such a fashion that the movement of one guide member is synchronized to the movement of the other guide members.

6. The apparatus of claim 3 wherein the bottom portion of the U-shaped guide members supports at least one shoe which is adapted to contact the blown thermoplastic tube.

7. The apparatus of claim 4 wherein four U-shaped guide members are utilized and the bottom portion of the U-shaped guide member contains at least two Teflon-coated shoes which are adapted to contact the blown thermoplastic tube and wherein each guide member is provided with a locking means whereby it can be securely and permanently positioned in relation to the axis of the blown thermoplastic tube.

References Cited

UNITED STATES PATENTS

| 2,544,044 | 3/1951 | Reber et al. |
| 2,641,022 | 6/1953 | Kress. |
| 3,002,430 | 10/1961 | Voight et al. |
| 3,355,770 | 12/1967 | Augustin. |
| 3,398,432 | 8/1968 | Quackenbush et al. |

WILLIAM J. STEPHENSON, JR., Primary Examiner